(12) United States Patent
Malaguti et al.

(10) Patent No.: US 11,519,492 B2
(45) Date of Patent: Dec. 6, 2022

(54) UPGRADED PLANETARY GEARBOX

(71) Applicant: DINAMIC OIL S.P.A., Bomporto (IT)

(72) Inventors: Andrea Malaguti, Modena (IT); Alan Bertani, Modena (IT)

(73) Assignee: DINAMIC OIL S.P.A., Bomporto (IT)

( * ) Notice: Subject to any disclaimer, the term of this patent is extended or adjusted under 35 U.S.C. 154(b) by 136 days.

(21) Appl. No.: 16/788,903

(22) Filed: Feb. 12, 2020

(65) Prior Publication Data

US 2021/0148448 A1 May 20, 2021

(30) Foreign Application Priority Data

Nov. 19, 2019 (IT) .......................... 102019000021570

(51) Int. Cl.
| | |
|---|---|
| *F16H 57/08* | (2006.01) |
| *F16H 1/46* | (2006.01) |
| *G01L 3/14* | (2006.01) |
| *F16H 57/021* | (2012.01) |

(52) U.S. Cl.
CPC ............... *F16H 57/08* (2013.01); *F16H 1/46* (2013.01); *F16H 57/021* (2013.01); *G01L 3/1471* (2013.01)

(58) Field of Classification Search
CPC .......... F16H 57/08; F16H 1/46; F16H 57/021; G01L 3/1471
See application file for complete search history.

(56) References Cited

U.S. PATENT DOCUMENTS

| | | | |
|---|---|---|---|
| 2010/0139432 A1* | 6/2010 | Steckel | B25B 23/1425 74/412 TA |
| 2018/0149533 A1* | 5/2018 | Hu | B25B 23/147 |
| 2021/0031341 A1* | 2/2021 | Chang | B25B 23/1425 |

FOREIGN PATENT DOCUMENTS

EP           2436949 B1 *  7/2013  ........... G01L 3/1471

* cited by examiner

*Primary Examiner* — Richard W Ridley
*Assistant Examiner* — Aimee Tran Nguyen
(74) *Attorney, Agent, or Firm* — NK Patent Law

(57) ABSTRACT

The subject matter described herein includes an upgraded planetary gearbox including an input support provided with an input transmission element axially rotatable and connectable to an external appliance, an output support provided with an output transmission element axially rotatable and connectable to an external appliance or to an external tool, at least one planetary wheelwork operationally placed between the input transmission element and the output transmission element, and a static coupling member between the planetary wheelwork and at least one of either the input support or the output support, wherein at least one of the static coupling member, the input support and the output support includes a measuring sensor for measuring the drive torque transmitted by the output transmission element.

13 Claims, 3 Drawing Sheets

UPGRADED PLANETARY GEARBOX

CROSS-REFERENCE TO RELATED APPLICATION(S)

This application claims priority to Italian Patent Application No. 102019000021570 filed on Nov. 19, 2019, the entire content of which is incorporated herein by reference.

TECHNICAL FIELD

The present invention relates to an upgraded planetary gearbox, which can be used to detect the transmitted drive torque.

BACKGROUND

The use of planetary gearboxes has long been known and widespread in a wide range of mechanical applications.

As is well known, in fact, a planetary gearbox is a mechanical component which, through a suitable mechanism, is able to modify the speed ratios between an input shaft and an output drive shaft.

Specifically, with reference e.g. to geometrically coaxial models, a planetary gearbox comprises a central sun gear, an external gearwheel having internal toothing, and a plurality of axially rotatable satellite gears, supported by a satellite holder, which is rotatable in turn. The satellite gears are operationally interposed between the central sun gear and the external gearwheel and transmit the motion by rotating on a concentric orbit.

Furthermore, with reference to different applications, the need is known to detect the drive torque transmitted by the planetary gearbox during use.

For example, with reference to soil drilling equipment and machines, a drill is commonly associated with the output drive shaft of the planetary gearbox.

In this case, it may be necessary to detect the drive torque transmitted from the gearbox to the drill during drilling, in order to monitor in real time the characteristics of the soil. This can allow, e.g., evaluating in real time when the optimal drilling depth has been reached according to the specific type of soil.

Therefore, in order to monitor the transmitted torque, solutions are known wherein a suitable measurement device (e.g. of the type of a torque transducer of one or more load cells or similar devices) is placed between the output drive shaft of the gearbox and the drill.

The measuring device provides at output an electrical signal proportional to the measured forces (usually a voltage) and is usually connected to a special processing unit for processing this electrical signal. The processing unit, once correctly configured, is able to translate this electrical signal into a torque measurement.

Known solutions do however have some drawbacks.

In fact, such solutions necessarily require the use of an additional measuring device in addition to the planetary gearbox.

Therefore, this entails an additional cost and greater complexity of the equipment, which therefore must be properly assembled and maintained by an expert technician to ensure the proper functioning thereof.

In addition, the use of an additional measuring device requires a correct configuration of the device itself, once assembled, in order to avoid incorrect measurements.

Furthermore, the measuring device, being placed between the gearbox drive shaft and the tool (e.g. the drill), therefore between two non-static elements, inevitably entails greater complexity of the measuring device, thus increasing the risk of damaging it during operation.

The main aim of the present invention is to devise an upgraded planetary gearbox that allows detecting the transmitted torque, but that is simple and affordable at the same time.

Another object of the present invention is to devise an upgraded planetary gearbox capable of ensuring accurate measurements of the transmitted drive torque.

Another object of the present invention is to devise an upgraded planetary gearbox that is easy to use and configure.

The aforementioned objects are achieved by the present upgraded planetary gearbox according to the characteristics described in claim 1.

SUMMARY

This summary is provided to introduce, in a simplified form, concepts that are further described in the following detailed descriptions. This summary is not intended to identify key features or essential features of the claimed subject matter, nor is it to be construed as limiting the scope of the claimed subject matter.

Disclosed herein is an upgraded planetary gearbox, including at least one input support provided with at least one input transmission element axially rotatable and connectable to an external appliance, at least one output support provided with an output transmission element axially rotatable and connectable to an external appliance or to an external tool, at least one planetary wheelwork operationally placed between said input transmission element and said output transmission element, and at least one static coupling member between said planetary wheelwork and at least one of either said input support or said output support, wherein at least one of said static coupling member, said input support and said output support includes at least one measuring sensor for measuring the drive torque transmitted by said output transmission element.

According to one or more embodiments, said static coupling member includes said at least one measuring sensor.

According to one or more embodiments, said measuring sensor includes at least one strain gauge associated with said static coupling member.

According to one or more embodiments, said static coupling member includes at least one housing seat of said measuring sensor.

According to one or more embodiments, the gearbox includes at least one electrical connector connected to said at least one measuring sensor.

According to one or more embodiments, the gearbox includes at least one processing unit connected to said at least one measuring sensor and to said electrical connector and configured to process the electrical signals coming from said measuring sensor and to send to the electrical connector a signal that can be used to measure the detected drive torque.

According to one or more embodiments, the gearbox includes a plurality of measuring sensors.

According to one or more embodiments, said planetary wheelwork includes an axially rotatable sun pinion, an external static gearwheel having internal toothing, a rotatable satellite holder provided with a plurality of axially rotatable satellite gears engaged between said sun pinion and said internal toothing of the external static gearwheel.

According to one or more embodiments, said static coupling member is locked together with said external static gearwheel.

According to one or more embodiments, said static coupling member includes at least one flange that can be fixed to said planetary wheelwork and to at least one of either said input support or said output support.

According to one or more embodiments, said flange includes a plurality of structural unloads which are shaped so as to concentrate the stresses and deformations during the use of the gearbox at the point where said at least one measuring sensor is located.

According to one or more embodiments, the gearbox includes at least a first planetary wheelwork operationally connected to said input transmission element and at least a second planetary wheelwork operationally connected to said output transmission element, wherein said static coupling member is fixed to said input support by interposition of said first planetary wheelwork and is fixed to said output support by interposition of said second planetary wheelwork.

According to one or more embodiments, said static coupling member is locked together with a first external static gearwheel of said first planetary wheelwork and with a second external static gearwheel of said second planetary wheelwork.

BRIEF DESCRIPTION OF THE FIGURES

Other characteristics and advantages of the present invention will be more evident from the description of a preferred, but not exclusive, embodiment of an upgraded planetary gearbox, illustrated as an indicative, yet not limiting example, in the attached tables of drawings in which:

FIGS. 2 and 3 are axonometric and exploded view of the planetary gearbox of

FIG. 1;

DETAILED DESCRIPTION

Figure 1:
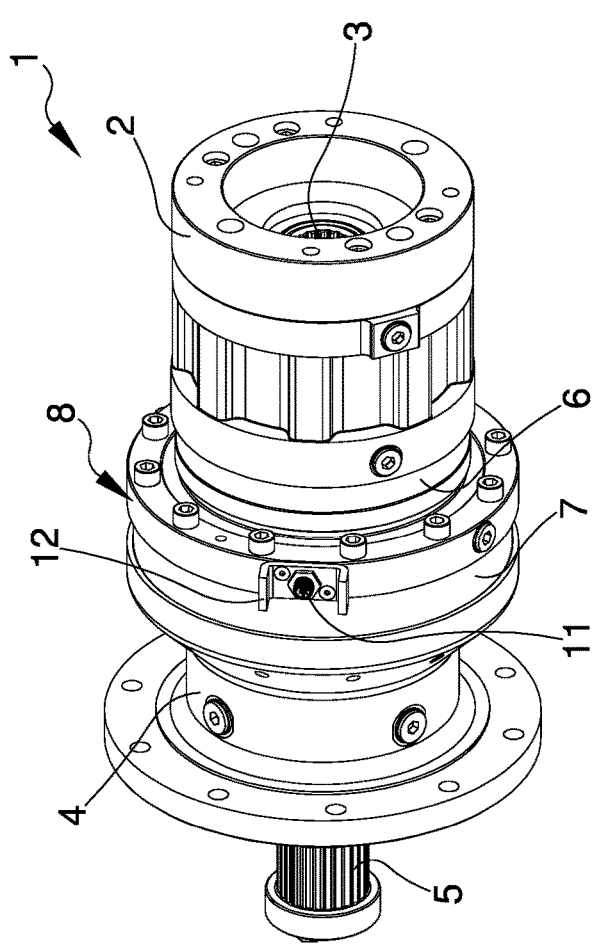
FIG. 1 is an axonometric view showing a possible embodiment of the planetary gearbox according to the invention.
Figure 2:
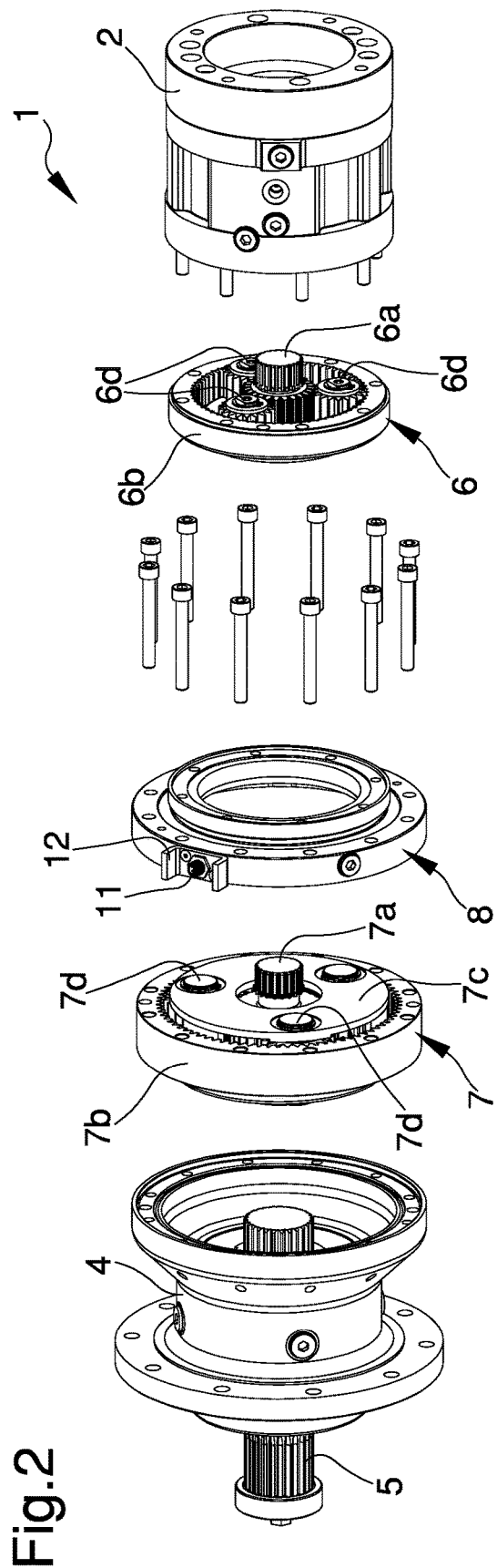
Figure 3:
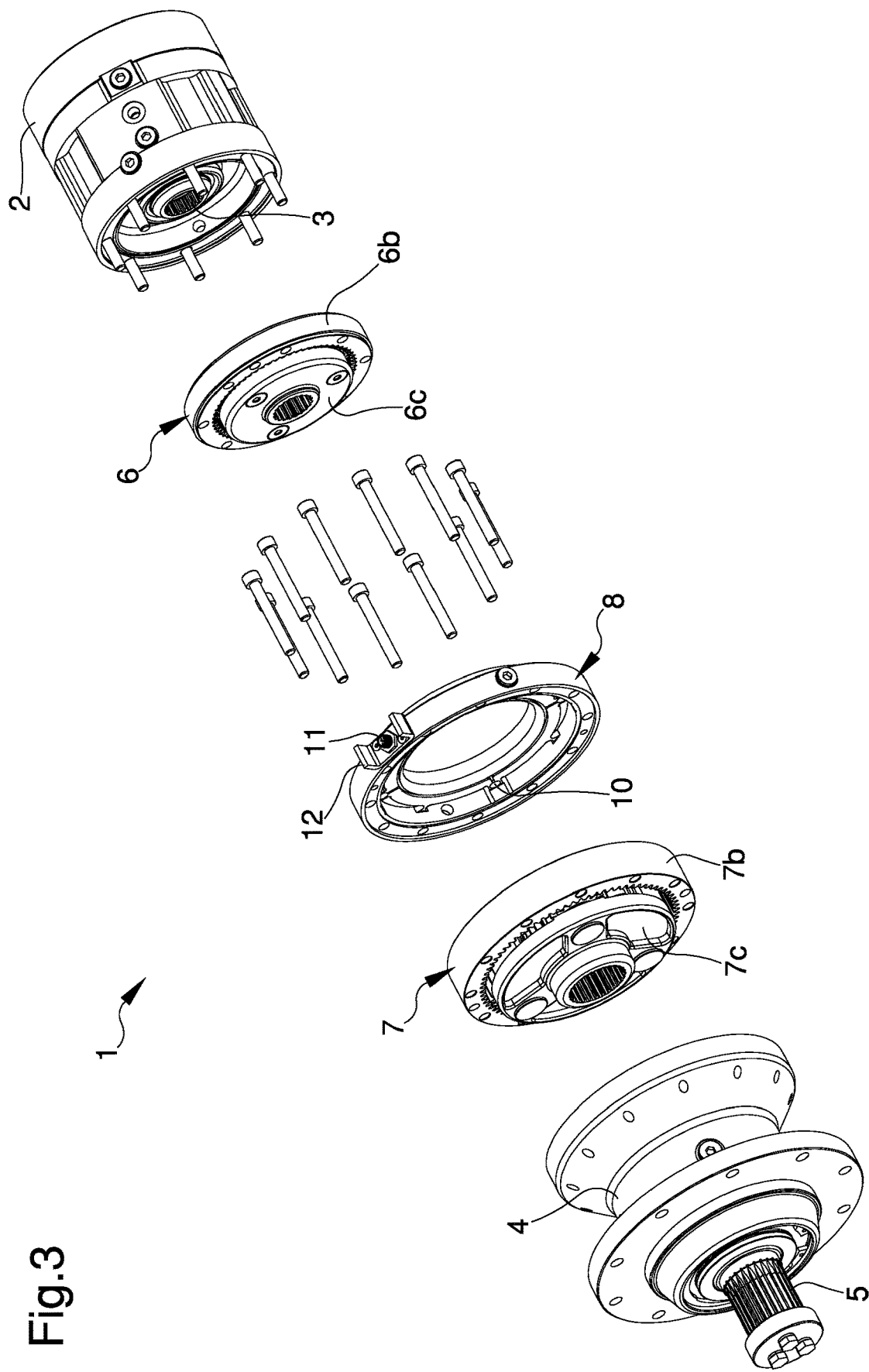

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, area, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

With particular reference to these illustrations, reference numeral 1 globally indicates an upgraded planetary gearbox, which can be used in particular for the detection of the transmitted drive torque.

The upgraded planetary gearbox 1 according to the invention includes at least one input support 2 provided with at least one input transmission element 3 axially rotatable and connectable to an external appliance, at least one output support 4 provided with an output transmission element 5 axially rotatable and connectable to an external appliance or to an external tool, and at least one planetary wheelwork 6, 7 operationally placed between the input transmission element 3 and the output transmission element 5.

In particular, with reference to a possible embodiment, shown in the figures, the input transmission element 3 and the output transmission element 5 are composed of an input transmission shaft and an output transmission shaft, respectively.

In addition, the gearbox 1 comprises at least one static coupling member 8 adapted to couple the planetary wheelwork 6, 7 to at least one of either the input support 2 or the output support 4.

At least one of the static coupling member 8, the input support 2 and the output support 4 comprises at least one measuring sensor 9 for measuring the drive torque transmitted by the gearbox 1.

According to a preferred embodiment, shown in the figures, the static coupling member 8 is provided with at least one measuring sensor 9.

In particular, the presence of such a static coupling member 8 provided with a measuring sensor 9 allows detecting the transmitted drive torque effectively and with adequate precision, while avoiding to increase the complexity and the overall cost of the gearbox 1 at the same time.

In particular, the measuring sensor 9 comprises at least one strain gauge associated with the static coupling member 8.

Preferably, the gearbox 1 comprises a plurality of measuring sensors 9.

With reference to the preferred embodiment shown in the figures, the gearbox 1 comprises a plurality of measuring sensors 9 suitably arranged on the static coupling member 8.

Figure 5:
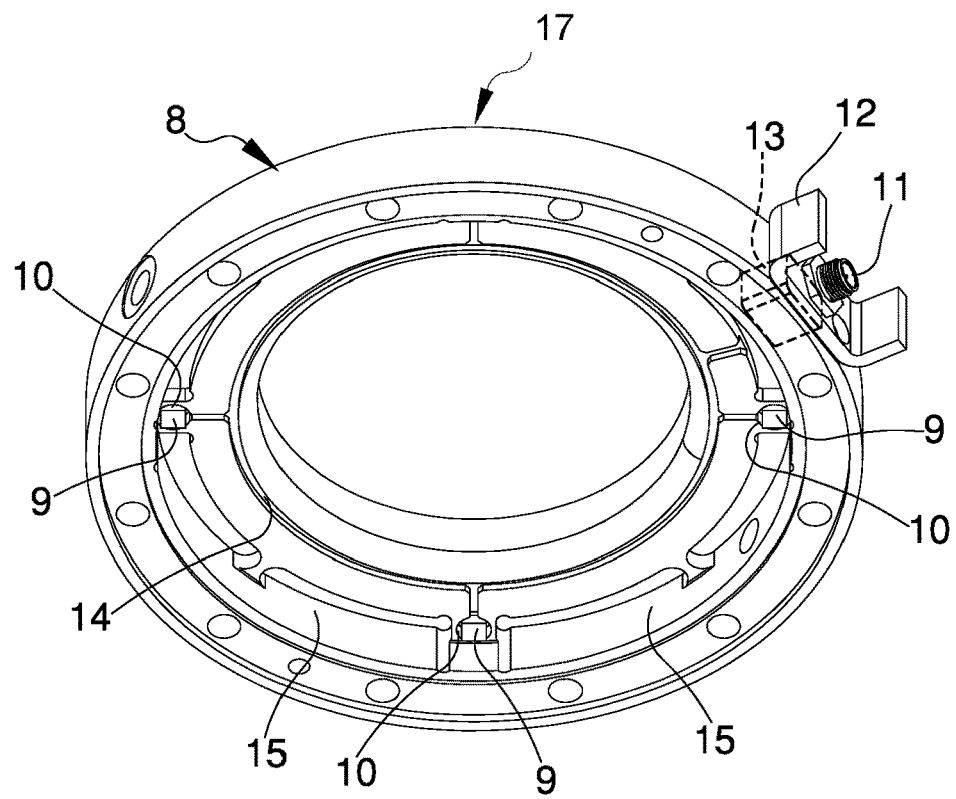

In particular, as shown in detail in FIG. 5, the measuring sensors 9 are positioned inside their respective housings 10 obtained on the body of the static coupling element and suitably spaced apart from each other.

In addition, still according to a preferred embodiment, the static coupling member 8 comprises at least one electrical connector 11 connected to the measuring sensors 9. The electrical connector 11 is an output connector of an electrical signal generated by the measuring sensors 9 and is indicative of the detected drive torque.

In addition, the static coupling member 8 is preferably provided with a protective plate 12 for protecting the electrical connector 11.

Figure 4:
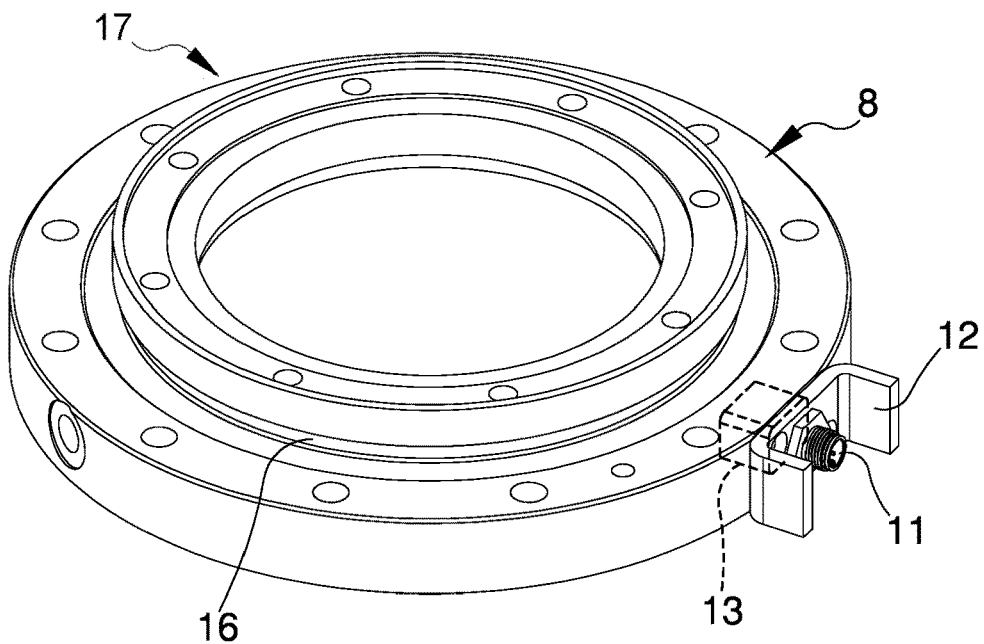
FIG. 4 and FIG. 5 are axonometric views of a flange of the planetary gearbox according to the invention.

Advantageously, the gearbox 1 also comprises a processing unit 13, shown in FIGS. 4 and 5, connected to the measuring sensors 9 and to the electrical connector 11 and configured to process the electrical signals coming from the measuring sensors 9 to send to the electrical connector 11 a signal that can be used to measure the detected drive torque.

In particular, the processing unit 13 comprises a combiner which is configured to combine the plurality of signals from the individual measuring sensors 9 and an electrical amplifier configured to amplify the individual combined signal obtained.

With reference to the preferred embodiment shown in the figures, the processing unit 13 is housed in a corresponding seat made on the static coupling member 8.

Preferably, the static coupling member 8 is made up of a flange that can be fixed to the planetary wheelwork 6, 7 and to at least one of either the input support 2 or the output support 4.

The flange 17 is preferably made of isotropic steel.

Conveniently, the flange 17 comprises at least one cable duct 14 for housing the connecting cable of the measuring sensors 9 to the processing unit 13.

In addition, the flange 17 has an internal architecture intended to optimize the correct torque detection.

In particular, the flange 17 comprises a plurality of structural unloads 15, 16 which are shaped so as to concentrate the stresses and deformations during the use of the gearbox 1 at the point where the housings 10 are located in which the measuring sensors 9 are arranged.

With reference to a preferred embodiment, shown in the figures, the gearbox 1 comprises a first planetary wheelwork 6 operationally connected to the input transmission shaft 3 and a second planetary wheelwork 7 operationally connected to the output transmission shaft 5. The static coupling member 8 is fixed to the input support 2 by interposition of the first planetary wheelwork 6 and is fixed to the output support 4 by interposition of the second planetary wheelwork 7.

Each of the planetary wheelworks 6, 7 in the gearbox 1 is the type of a conventional planetary wheelwork and comprises: an axially rotatable sun pinion; an external static gearwheel having internal toothing; a rotatable satellite holder provided with a plurality of axially rotatable satellite gears and engaged between the sun pinion and the internal tooting of the external static gearwheel.

In particular, the first planetary wheelwork 6 comprises: a first axially rotatable sun pinion 6a; a first external static gearwheel 6b having internal toothing; a first rotatable satellite holder 6c provided with a plurality of first axially rotatable satellite gears 6d engaged between the first sun pinion 6a and the internal toothing of the first external static gearwheel 6b.

Similarly, the second planetary wheelwork 7 comprises: a second axially rotatable sun pinion 7a; a second external static gearwheel 7b having internal toothing; a second rotatable satellite holder 7c provided with a plurality of second axially rotatable satellite gears 7d engaged between the second sun pinion 7a and the internal toothing of the second external static gearwheel 7b.

For example, according to a possible and preferred configuration, the first sun pinion 6a of the first planetary wheelwork 6 is locked in rotation together with the input transmission shaft 3, the first rotatable satellite holder 6c of the first planetary wheelwork 6 is locked in rotation together with the second sun pinion 7a of the second planetary wheelwork 7, while the second satellite holder 7c of the second planetary wheelwork 7 is locked in rotation together with the output transmission shaft 5.

The flange 17 is locked together with the first external static gearwheel 6b of the first planetary wheelwork 6 and with the second external static gearwheel 7b of the second planetary wheelwork 7.

The gearbox 1 may also comprise a braking mechanism which can be operated for locking the input transmission shaft. In particular, the input support 2 may be provided with such a braking mechanism.

It has in practice been found that the described invention achieves the intended objects.

In particular, it is emphasized that the planetary gearbox according to the invention is a gearbox of standard size and allows an effective survey of the transmitted torques without the use of additional external components, without any dimensional change of any of its components and without the use of additional moving components.

Therefore, the gearbox according to the invention allows accurate measurements of the transmitted drive torque and, at the same time, it is simple and inexpensive.

In addition, the gearbox according to the invention is easy to use and to configure.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The invention claimed is:

1. Upgraded planetary gearbox, comprising:
   at least one input support provided with at least one input transmission element axially rotatable;
   at least one output support provided with an output transmission element axially rotatable;
   multiple planetary wheelworks comprising at least a first planetary wheelwork operationally connected to said input transmission element and at least a second planetary wheelwork operationally connected to said output transmission element, wherein at least one of said first planetary wheelwork and second planetary wheelwork is operationally placed between said input transmission element and said output transmission element; and
   at least one static coupling member between at least one of said multiple planetary wheelworks and at least one of either said input support or said output support,
   wherein at least one of said static coupling member, said input support and said output support comprises at least one measuring sensor for measuring the drive torque transmitted by said output transmission element and wherein said static coupling member is fixed to said input support by interposition of said first planetary wheelwork and is fixed to said output support by interposition of said second planetary wheelwork.

2. Gearbox according to claim 1, wherein said static coupling member is locked together with a first external static gearwheel of said first planetary wheelwork and with a second external static gearwheel of said second planetary wheelwork.

3. Gearbox according to claim 1, wherein said static coupling member comprises said at least one measuring sensor.

4. Gearbox according to claim 1, wherein said measuring sensor comprises at least one strain gauge associated with said static coupling member.

5. Gearbox according to claim 1, wherein said static coupling member comprises at least one housing seat of said measuring sensor.

6. Gearbox according to claim 1, wherein the gearbox comprises at least one electrical connector connected to said at least one measuring sensor.

7. Gearbox according to claim 6, wherein the gearbox comprises at least one processing unit connected to said at least one measuring sensor and to said electrical connector and configured to process the electrical signals coming from said measuring sensor and to send to the electrical connector a signal that can be used to measure the detected drive torque.

8. Gearbox according to claim 1, wherein the gearbox comprises a plurality of measuring sensors.

9. Gearbox according to claim 1, wherein at least one of said multiple planetary wheelworks comprises an axially rotatable sun pinion, an external static gearwheel having internal toothing, a rotatable satellite holder provided with a plurality of axially rotatable satellite gears engaged between said sun pinion and said internal toothing of the external static gearwheel.

10. Gearbox according to claim 9, wherein said static coupling member is locked together with said external static gearwheel.

11. Gearbox according to claim 1, wherein said static coupling member comprises at least one flange that can be fixed to at least one of said multiple planetary wheelworks and to at least one of either said input support or said output support.

12. Upgraded planetary gearbox, comprising:
    at least one input support provided with at least one input transmission element axially rotatable;
    at least one output support provided with an output transmission element axially rotatable;
    multiple planetary wheelworks comprising at least a first planetary wheelwork operationally connected to said input transmission element and at least a secondary planetary wheelwork operationally connected to said output transmission element wherein at least one of said first multiple planetary wheelworks is operationally placed between said input transmission element and said output transmission element, wherein at least one of said multiple planetary wheelworks comprises an axially rotatable sun pinion, an external static gearwheel having internal toothing, a rotatable satellite holder provided with a plurality of axially rotatable satellite gears engaged between said sun pinion and said internal toothing of the external static gearwheel; and
    at least one static coupling member between at least one of said multiple planetary wheelworks and at least one of either said input support or said output support wherein said at least one static coupling member is fixed to said input support by interposition of said first planetary wheelwork and is fixed to said output support by interposition of said second planetary wheelwork,
    wherein said at least one static coupling member comprises at least one flange component having a radially extending portion, said flange component locked together to at least one of said multiple planetary wheelworks and to at least one of either said input support or said output support and wherein at least one of said static coupling member, said input support and said output support comprises at least one measuring sensor for measuring the drive torque transmitted by said output transmission element.

13. Gearbox according to claim 12, wherein said static coupling member is locked together with a first external static gearwheel of said first planetary wheelwork and with a second external static gearwheel of said second planetary wheelwork.

* * * * *